United States Patent
Huang et al.

(10) Patent No.: US 11,763,796 B2
(45) Date of Patent: Sep. 19, 2023

(54) COMPUTER-IMPLEMENTED METHOD FOR SPEECH SYNTHESIS, COMPUTER DEVICE, AND NON-TRANSITORY COMPUTER READABLE STORAGE MEDIUM

(71) Applicant: UBTECH ROBOTICS CORP LTD, Shenzhen (CN)

(72) Inventors: Dongyan Huang, Shenzhen (CN); Leyuan Sheng, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 438 days.

(21) Appl. No.: 17/117,148

(22) Filed: Dec. 10, 2020

(65) Prior Publication Data
US 2022/0189454 A1    Jun. 16, 2022

Related U.S. Application Data

(63) Continuation of application No. PCT/CN2019/127911, filed on Dec. 24, 2019.

(51) Int. Cl.
*G10L 13/04*   (2013.01)
*G10L 13/02*   (2013.01)
*G10L 25/30*   (2013.01)
*G10L 25/24*   (2013.01)
(Continued)

(52) U.S. Cl.
CPC .............. *G10L 13/02* (2013.01); *G06F 17/14* (2013.01); *G06N 3/08* (2013.01); *G06N 20/10* (2019.01);
(Continued)

(58) Field of Classification Search
CPC ....... G10L 19/06; G10L 13/047; G10L 25/69; G10L 13/08; G10L 19/18; G10L 13/04;
(Continued)

(56) References Cited

U.S. PATENT DOCUMENTS

2012/0053933 A1*  3/2012  Tamura .............. G10L 13/04
                                                 704/207
2012/0265534 A1* 10/2012  Coorman ............ G10L 13/033
                                                 704/265
(Continued)

FOREIGN PATENT DOCUMENTS

CN            110136690 A       8/2019

OTHER PUBLICATIONS

Shen et al, "Natural tts synthesis by conditioning wavenet on mel spectrogram predictions", 2018, In2018 IEEE international conference on acoustics, speech and signal processing (ICASSP) Apr. 15, 2018 (pp. 4779-4783). IEEE.*

(Continued)

*Primary Examiner* — Olujimi A Adesanya

(57) ABSTRACT

A computer-implemented method for speech synthesis, a computer device, and a non-transitory computer readable storage medium are provided. The method includes: obtaining a speech text to be synthesized; obtaining a Mel spectrum corresponding to the speech text to be synthesized according to the speech text to be synthesized; inputting the Mel spectrum into a complex neural network, and obtaining a complex spectrum corresponding to the speech text to be synthesized, wherein the complex spectrum comprises real component information and imaginary component information; and obtaining a synthetic speech corresponding to the speech text to be synthesized, according to the complex spectrum. The method can efficiently and simply complete speech synthesis.

20 Claims, 10 Drawing Sheets

(51) Int. Cl.
*G06F 17/14* (2006.01)
*G06N 3/08* (2023.01)
*G06N 20/10* (2019.01)
*G10L 21/0324* (2013.01)

(52) U.S. Cl.
CPC .......... *G10L 21/0324* (2013.01); *G10L 25/24* (2013.01); *G10L 25/30* (2013.01)

(58) Field of Classification Search
CPC .......... G10L 19/16; G06N 20/00; G06N 3/08; G06N 3/02; G06N 5/02
See application file for complete search history.

(56) References Cited

U.S. PATENT DOCUMENTS

| | | | |
|---|---|---|---|
| 2019/0251421 A1* | 8/2019 | Wang | G06N 3/08 |
| 2019/0355347 A1* | 11/2019 | Arik | G06N 20/20 |
| 2020/0066253 A1* | 2/2020 | Peng | G06F 17/18 |
| 2021/0110810 A1* | 4/2021 | Ping | G06F 9/30003 |
| 2022/0165247 A1* | 5/2022 | Kang | G10L 21/10 |

OTHER PUBLICATIONS

Takaki et al, "STFT spectral loss for training a neural speech waveform model", May 2019, InICASSP 2019-2019 IEEE International Conference on Acoustics, Speech and Signal Processing (ICASSP) May 12, 2019 (pp. 7065-7069). IEEE.*

Hu et al, "Initial investigation of speech synthesis based on complex-valued neural networks," 2016, 2016 IEEE International Conference on Acoustics, Speech and Signal Processing (ICASSP), Shanghai, China, 2016, pp. 5630-5634.*

Wang et al, "A comparison of recent waveform generation and acoustic modeling methods for neural-network-based speech synthesis", 2018, In 2018 IEEE International Conference on Acoustics, Speech and Signal Processing (ICASSP) Apr. 15, 2018 (pp. 4804-4808). IEEE.*

Tachibana et al., "Efficiently trainable text-to-speech system based on deep convolutional networks with guided attention", 2018, In 2018 IEEE international conference on acoustics, speech and signal processing (ICASSP) Apr. 15, 2018 (pp. 4784-4788). IEEE.*

Juvela et al, "GELP: GAN-excited linear prediction for speech synthesis from mel-spectrogram", Apr. 2019, arXiv preprint arXiv: 1904.03976. Apr. 8, 2019.*

Menon et al, "Development of a neural network library for resource constrained speech synthesis", Dec. 1, 2020, In 2020 5th IEEE International Conference on Recent Advances and Innovations in Engineering (ICRAIE) Dec. 1, 2020 (pp. 1-8). IEEE.*

Naijun Zheng, «Master Thesis of Xidian University» , Signal Enhancement Based on Complex-valued Neural Networks, Dec. 31, 2018, pp. 23-39.

ISR for PCT/CN2019/127911.

Written opinions of ISA for PCT/CN2019/127911.

* cited by examiner

COMPUTER-IMPLEMENTED METHOD FOR SPEECH SYNTHESIS, COMPUTER DEVICE, AND NON-TRANSITORY COMPUTER READABLE STORAGE MEDIUM

CROSS REFERENCE TO RELATED APPLICATIONS

The present application is a continuation-application of International Application PCT/CN2019/127911, with an international filing date of Dec. 24, 2019, the contents of all of which are hereby incorporated by reference.

BACKGROUND

1. Technical Field

The present disclosure generally relates to speech synthesis technology, and particularly to a computer-implemented method for speech synthesis, a computer device, and a non-transitory computer readable storage medium.

2. Description of Related Art

The speech synthesis technology is a process of obtaining a synthetic speech according to a speech text to be synthesized. During the speech synthesis, the quality of the synthetic speech is improved greatly by using a deep generative model, such as WaveNet. Compared with the traditional speech synthesizer, the WaveNet shows excellent performance.

However, the WaveNet needs to generate sampling points of speech during the speech synthesis, and the WaveNet is an autoregressive model. Due to the autoregressive property of the WaveNet, the speed of the speech synthesis is slow. Moreover, due to the need to generate a large number of speech sampling points, the speed of the speech synthesis becomes even slower, and the process of the speech synthesis is complicated.

BRIEF DESCRIPTION OF DRAWINGS

In order to more clearly illustrate the technical solutions in the embodiments of the present disclosure, the drawings used in the embodiments or the prior art description will be briefly introduced below, obviously, the drawings in the following description are only some embodiments of the present disclosure, and those skilled in the art without any creative labor can obtain other drawings according to the drawings.

DETAILED DESCRIPTION

In order to make the object, the features and the advantages of the present disclosure more obvious and understandable, in conjunction with the drawings in the embodiments of the present disclosure, the technical solutions in the embodiments of the present disclosure will be clearly and completely described below, obviously, the embodiments described below are only some of the embodiments of the present disclosure, but not all of the embodiments. Based on the embodiments of the present disclosure, all other embodiments obtained by those skilled in the art without creative labor are within the scope of the present disclosure.

Figure 1:
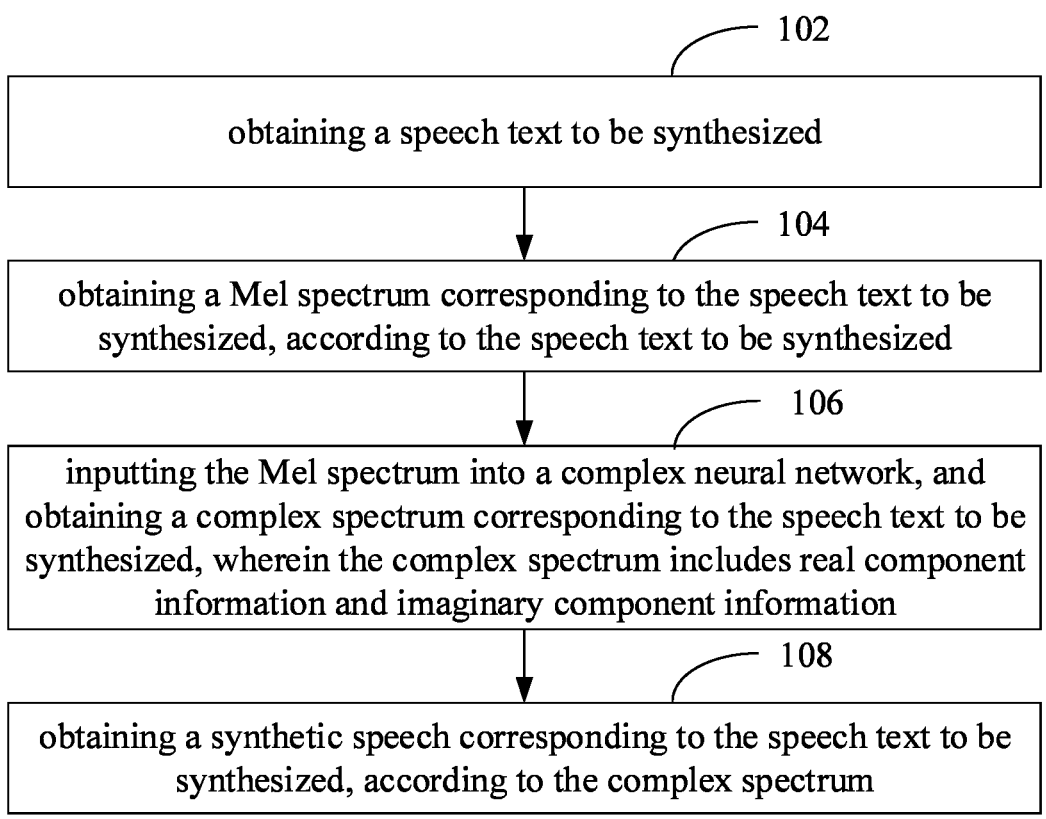
FIG. 1 is a schematic flow chart of one embodiment of a computer-implemented method for speech synthesis in accordance with the present disclosure.

As shown in FIG. 1, in one embodiment, a computer-implemented method for speech synthesis is provided. The executor of the computer-implemented method for speech synthesis in the embodiment is a device that can perform the method for speech synthesis in the embodiment. The device may, but is not limited to, include a terminal and a server. The terminal includes a mobile terminal and a desktop terminal. The mobile terminal may, but is not limited to, include a mobile phone, a tablet PC, and a note personal computer. The desktop terminal may, but is not limited to, include a desktop computer and a board computer. The server includes a high performance computer and a high performance computer cluster. The method for speech synthesis specifically includes the following steps.

Step 102, obtaining a speech text to be synthesized.

The speech text to be synthesized is a text corresponding to a speech to be synthesized. In the embodiment of the present disclosure, a target of speech synthesis is realized according to the speech text to be synthesized.

Step 104, obtaining a Mel spectrum corresponding to the speech text to be synthesized, according to the speech text to be synthesized.

The Mel spectrum is a way of expressing speech spectrum, and an ordinary speech spectrum is a large spectrum diagram. Speech frequency is filtered by using a Mel filter to obtain a relatively small spectrum diagram, and the relatively small spectrum diagram is the Mel spectrum.

The speech text to be synthesized is inputted into a sound spectrum network, and the sound spectrum network includes an encoder and a decoder. The encoder is used to obtain features of hidden layer according to the speech text to be synthesized, and the decoder is used to predict and obtain the Mel spectrum according to the features of hidden layer corresponding to speech text to be synthesized.

Specifically, the encoder includes a character vector unit, a convolution unit, and a bidirectional LSTM unit. The speech text to be synthesized is encoded into a character vector of fixed dimensions (e.g., 512 dimensions) by the character vector unit. The character vector is inputted into the convolution unit (e.g., 3-layers convolution kernel), and context features of the character vector are extracted by the convolution unit. The context features of the character vector extracted by the convolution unit are inputted into the bidirectional LSTM unit, and coding features are obtained. The decoder may be an autoregressive recurrent neural network. The decoder predicts the Mel spectrum according to the coding features outputted by the bidirectional LSTM unit.

Step 106, inputting the Mel spectrum into a complex neural network, and obtaining a complex spectrum corresponding to the speech text to be synthesized, wherein the complex spectrum includes real component information and imaginary component information.

An input to the complex neural network is the Mel spectrum, and an output from the complex neural network is the complex spectrum. In the embodiment of the present disclosure, the network structure of the complex neural network includes an U-net network structure.

The real component information and the imaginary component information can be regarded as two images. That is, the output of the complex neural network is regarded as two spectrum images.

Step 108, obtaining a synthetic speech corresponding to the speech text to be synthesized, according to the complex spectrum.

The synthetic speech corresponding to the speech text to be synthesized can be obtained, according to the complex spectrum corresponding to the speech text to be synthesized. Further, the synthetic speech corresponding to the speech text to be synthesized can be outputted, for example, the synthetic speech is played. It should be noted that, the complex spectrum includes the real component information and the imaginary component information, the final synthesized speech is synthesized based on the real component information and the imaginary component information. Therefore, compared with a method of synthesizing speech only based on the real component information, the speech synthesized according to the method of the embodiment of the present disclosure will be more real because of retaining more speech information.

In one embodiment, the step 108 of obtaining the synthetic speech corresponding to the speech text to be synthesized, according to the complex spectrum, includes: processing the complex spectrum by using an inverse short-time Fourier transform, and obtaining the synthetic speech corresponding to the speech text to be synthesized.

The speech itself is a one-dimensional time domain signal, and it is difficult to see the law of frequency variation of the speech from the time domain signal. The speech can be transformed from the time domain to the frequency domain by the Fourier. Although the frequency distribution of the speech can be seen at this time, the time domain information is missing, and it is also difficult to see the time domain information of the speech from the frequency domain distribution of the speech. In order to solve this problem, a lot of time and frequency domain analysis methods have appeared. The short-time Fourier transform is a very commonly used time and frequency domain analysis method, and the inverse short-time Fourier transform is an inverse process of the short-time Fourier transform.

Specifically, the short-time Fourier transform can transform the speech from the time domain to the frequency domain, and the inverse short-time Fourier transform can restore the speech in the frequency domain to the time domain. Compared with a method of synthesizing speech using an autoregressive model, it is simpler to use the inverse short-time Fourier transform (function) to restore the speech in the frequency domain to the time domain.

The above method for speech synthesis obtains the speech text to be synthesized; obtains the Mel spectrum corresponding to the speech text to be synthesized according to the speech text to be synthesized; inputs the Mel spectrum into the complex neural network, and obtains the complex spectrum corresponding to the speech text to be synthesized and including the real component information and the imaginary component information; and obtains the synthetic speech corresponding to the speech text to be synthesized according to the complex spectrum. Through the above method, the complex spectrum of the speech text is obtained according to the Mel spectrum corresponding to the speech text, the complex spectrum includes the real component information and the imaginary component information, the real component information and the imaginary component information can be regarded as two images, the pixel points required to generate two images are much smaller than the sample points required to generate speech, therefore, compared with the WaveNet autoregressive method, the above method has lower complexity and higher synthesis efficiency.

Figure 2:
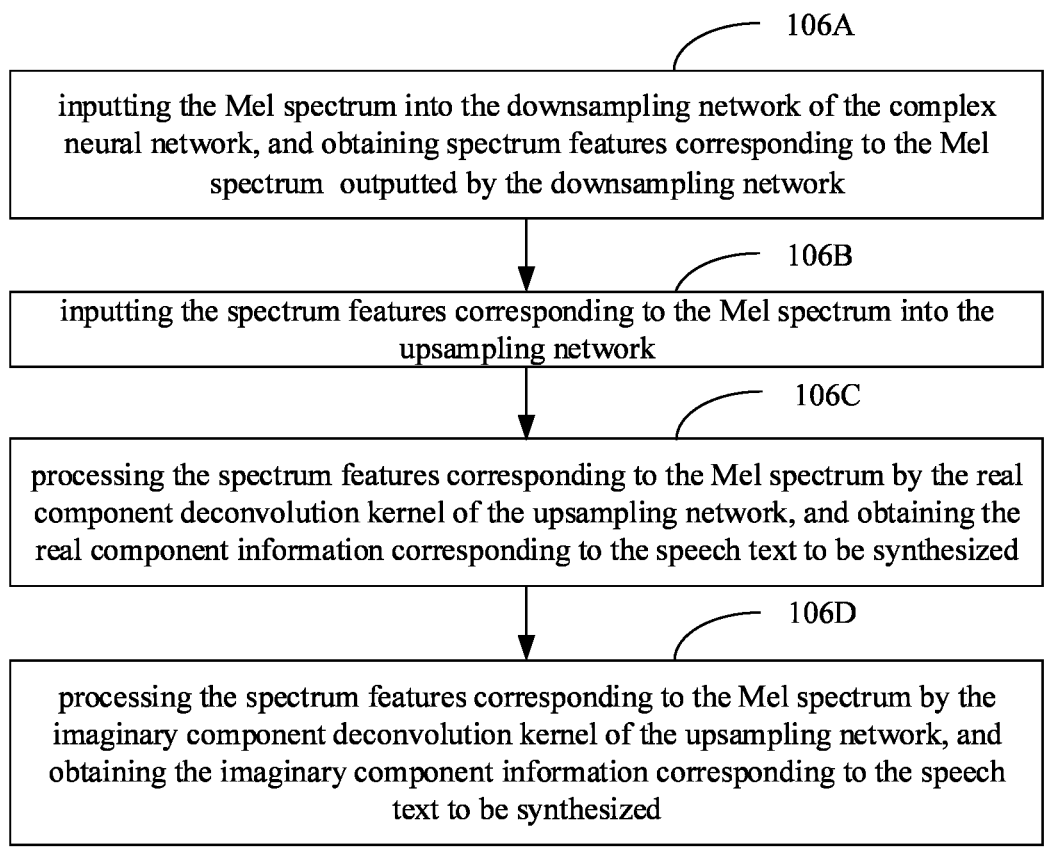
FIG. 2 is a schematic flow chart of one embodiment of step 106 in accordance with the present disclosure.

In one embodiment, the complex neural network includes a downsampling network and an upsampling network, and the upsampling network includes a real component deconvolution kernel and an imaginary component deconvolution kernel. As shown in FIG. 2, the step 106 of inputting the Mel spectrum into the complex neural network, and obtaining the complex spectrum corresponding to the speech text to be synthesized, includes the following steps.

Step 106A, inputting the Mel spectrum into the downsampling network of the complex neural network, and obtaining spectrum features corresponding to the Mel spectrum outputted by the downsampling network.

The downsampling network includes multiple layers, each layer is provided with a convolution kernel, the convolution kernel of each layer is used to extract the features of the input of this layer, so as to continuously excavate deeper features and realize the conversion from the large size to the small size. The Mel spectrum is inputted into the downsampling network, and the spectrum features corresponding to the Mel spectrum are obtained after feature extraction performed by multi-layer convolution kernel.

Step 106B, inputting the spectrum features corresponding to the Mel spectrum into the upsampling network.

After obtaining the spectrum features corresponding to the Mel spectrum, the obtained spectrum features are inputted into the upsampling network of the complex neural network, so that the upsampling network obtains the complex spectrum according to the spectrum features.

Step 106C, processing the spectrum features corresponding to the Mel spectrum by the real component deconvolution kernel of the upsampling network, and obtaining the real component information corresponding to the speech text to be synthesized.

The upsampling network is provided with a deconvolution kernel, and the deconvolution kernel performs the deconvolution operation. The deconvolution is transposed convolution used to realize the conversion from the small size to the large size.

Step 106D, processing the spectrum features corresponding to the Mel spectrum by the imaginary component deconvolution kernel of the upsampling network, and obtaining the imaginary component information corresponding to the speech text to be synthesized.

In the embodiment of the present disclosure, two deconvolution kernels are set in the upsampling network, which are the real component deconvolution kernel and the imaginary component deconvolution kernel. The real component information corresponding to the speech text to be synthesized is obtained by setting the real component deconvolution kernel to process the spectrum features. The imaginary component information corresponding to the speech text to be synthesized is obtained by setting the imaginary component deconvolution kernel to process the spectrum features.

Figure 3:
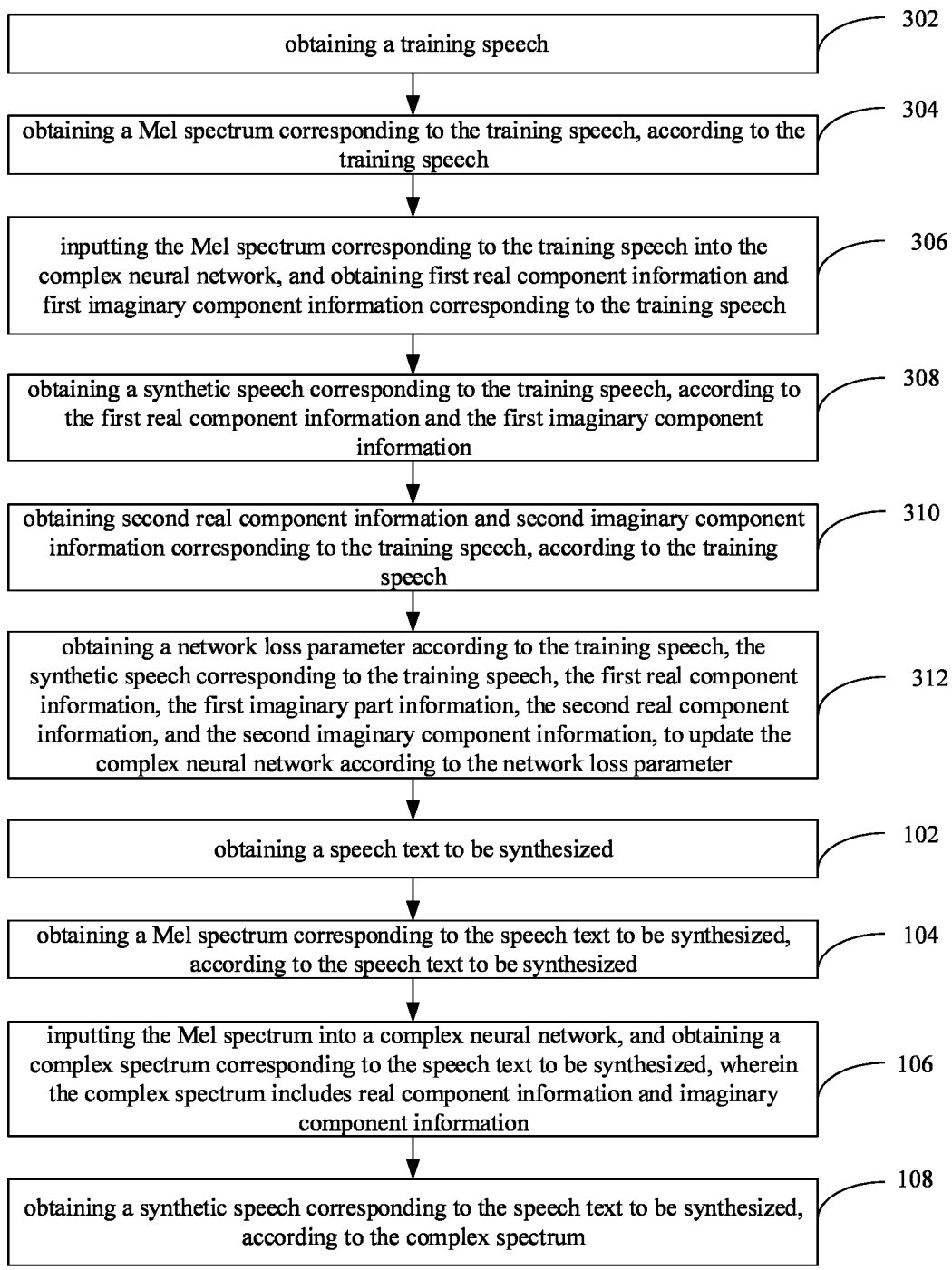
FIG. 3 is a schematic flow chart of another embodiment of the computer-implemented method for speech synthesis in accordance with the present disclosure.

In one embodiment, a training method of the speech text to be synthesized is provided. As shown in FIG. 3, before the step 102 of obtaining the speech text to be synthesized, the method further includes the following steps.

Step 302, obtaining a training speech.

The training speech is a speech used for training the complex neural network.

Step 304, obtaining a Mel spectrum corresponding to the training speech, according to the training speech.

In the embodiment of the present disclosure, an input of the complex neural network is the Mel spectrum. Therefore, the Mel spectrum corresponding to the training speech needs to be obtained first, then the complex neural network is trained by using the obtained Mel spectrum.

Figure 4:
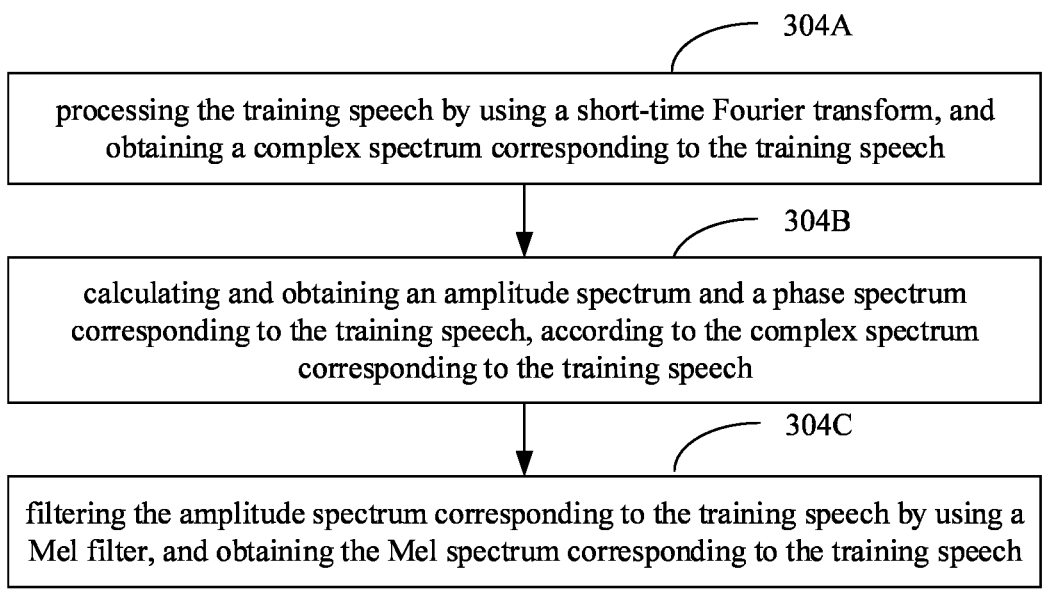
FIG. 4 is a schematic flow chart of one embodiment of step 304 in accordance with the present disclosure.

In one embodiment, as shown in FIG. 4, the step 304 of obtaining the Mel spectrum corresponding to the training speech, according to the training speech, includes the following steps.

Step 304A, processing the training speech by using a short-time Fourier transform, and obtaining a complex spectrum corresponding to the training speech.

The short-time Fourier transform refers to a function transformation that transforms the time domain signal to the frequency domain signal. The complex spectrum corresponding to the training speech can be obtained by processing the training speech using the short-time Fourier transform. The complex spectrum corresponding to the training speech includes a real component and an imaginary component.

Step 304B, calculating and obtaining an amplitude spectrum and a phase spectrum corresponding to the training speech, according to the complex spectrum corresponding to the training speech.

A calculation formula for converting the complex spectrum to the amplitude spectrum is obtained, and the amplitude spectrum corresponding to the training speech is calculated and obtained according to the calculation formula. A calculation formula for converting the complex spectrum to the phase spectrum is obtained, and the phase spectrum corresponding to the training speech is calculated and obtained according to the calculation formula.

Step 304C, filtering the amplitude spectrum corresponding to the training speech by using a Mel filter, and obtaining the Mel spectrum corresponding to the training speech.

The dimensions of the amplitude spectrum are reduced (filtered) by using the Mel filter, and the Mel spectrum can be obtained.

Step 306, inputting the Mel spectrum corresponding to the training speech into the complex neural network, and obtaining first real component information and first imaginary component information corresponding to the training speech.

Step 308, obtaining a synthetic speech corresponding to the training speech, according to the first real component information and the first imaginary component information.

The first real component information and the first imaginary component information corresponding to the training speech (that is, obtained complex spectrum corresponding to the training speech) outputted from the complex neural network are processed by the inverse short-time Fourier transform, and the synthetic speech can be generated. In the subsequent steps, the complex neural network will be updated according to the synthetic speech, the training speech, etc., so that the first real component information and the first imaginary component information outputted by the final complex neural network are closer to the real component information and the imaginary component information of the real speech by continuously updating the complex neural network, so as to improve the quality of the final synthesized speech.

Step 310, obtaining second real component information and second imaginary component information corresponding to the training speech, according to the training speech.

The second real component information and the second imaginary component information (that is, the complex spectrum) corresponding to the training speech are obtained, by processing the training speech using the short-time Fourier transform.

Step 312, obtaining a network loss parameter according to the training speech, the synthetic speech corresponding to the training speech, the first real component information, the first imaginary part information, the second real component information, and the second imaginary component information, to update the complex neural network according to the network loss parameter.

Figure 5:
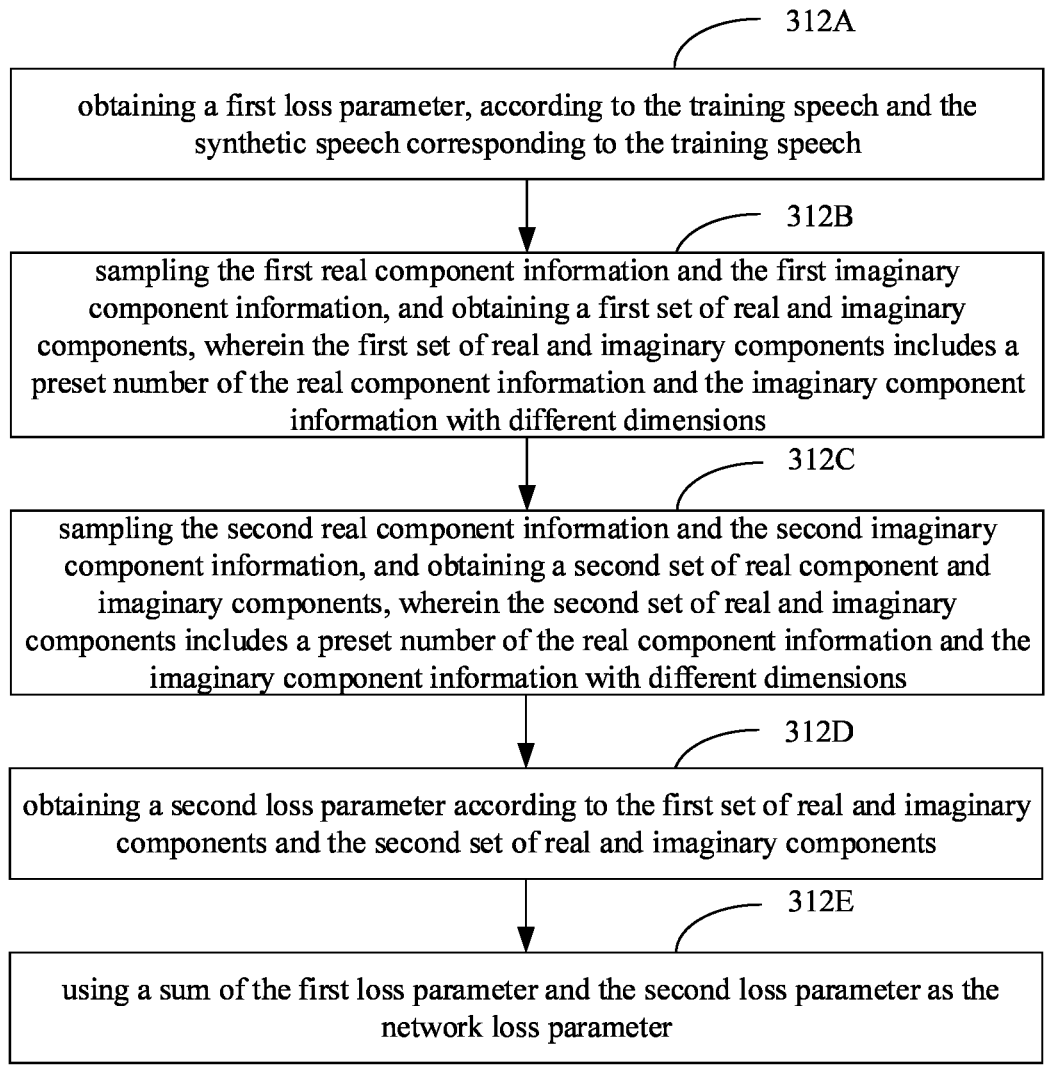
FIG. 5 is a schematic flow chart of one embodiment of step 312 in accordance with the present disclosure.

In one embodiment, as shown in FIG. 5, the step 312 includes the following steps.

Step 312A, obtaining a first loss parameter, according to the training speech and the synthetic speech corresponding to the training speech.

Figure 6:
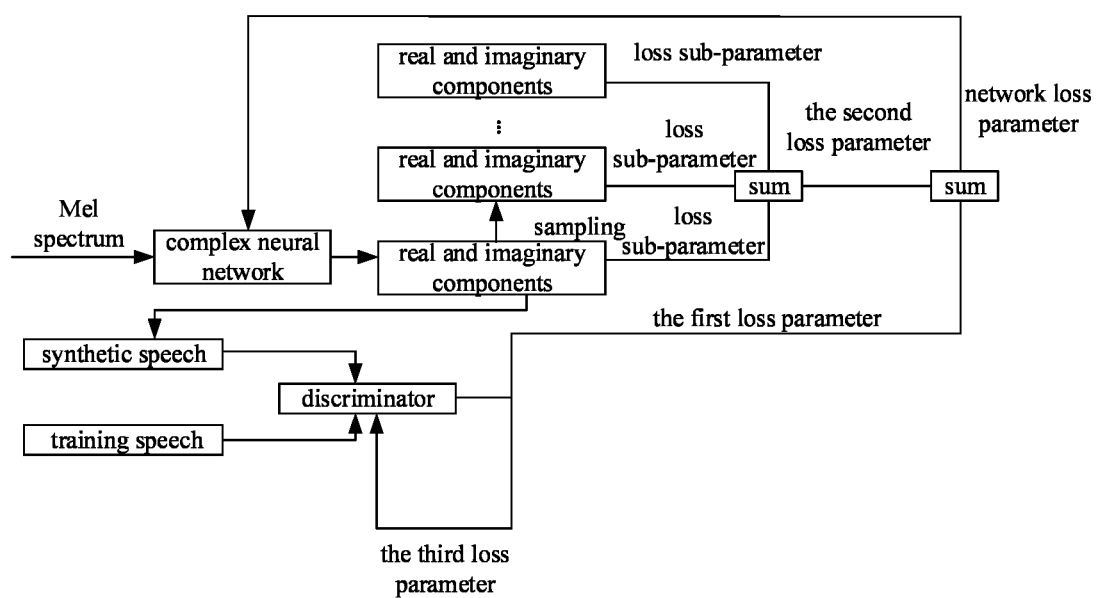
FIG. 6 is a diagram of one embodiment of training a complex neural network in accordance with the present disclosure.

As shown in FIG. 6, a discriminator compares the training speech with the synthetic speech, and outputs the first loss parameter according to the comparison result. Specifically, the greater the difference between the training speech and the synthetic speech, the greater the first loss parameter. Conversely, the smaller the difference between the training speech and the synthetic speech, the smaller the first loss parameter.

Further, the discriminator outputs the third loss parameter according to the training speech and the synthetic speech. The third loss parameter is used to determine the true and false of the synthetic speech and the training speech. If the synthetic speech is more true (closer to the training speech), the third loss parameter is smaller. If the synthetic speech is more false, the third loss parameter is greater. Then, the gradient descent algorithm is performed on the third loss parameter, so as to realize the update of the discriminator. Compared to the third loss parameter, the first loss parameter is judged in more detail.

Step 312B, sampling the first real component information and the first imaginary component information, and obtaining a first set of real and imaginary components, wherein the first set of real and imaginary components includes a preset number of the real component information and the imaginary component information with different dimensions.

As shown in FIG. 6, the first real component information and the first imaginary component information outputted by the complex neural network are sampled many times, and real component information and imaginary component information with lower dimension are obtained each time. Then, the real component information and imaginary component information with lower dimension are sampled. Finally, after multiple sampling, the preset number of the real component information and the imaginary component information with different dimensions are obtained. For example, the size before sampling is 512×512, the size after sampling is 256×256, and the size after resampling is 128×128.

Step 312C, sampling the second real component information and the second imaginary component information, and obtaining a second set of real component and imaginary components, wherein the second set of real and imaginary components includes a preset number of the real component information and the imaginary component information with different dimensions.

Similarly, the second real component information and the second imaginary component information corresponding to the training speech are sampled many times, and real component information and imaginary component information with lower dimension are obtained each time. Then, the real component information and imaginary component information with lower dimension are sampled. Finally, after multiple sampling, the preset number of the real component information and the imaginary component information with different dimensions are obtained. The sampling parameters of each sampling in the sampling process of the second real component information and the second imaginary component information are consistent with the sampling parameters of each sampling in the sampling process of the first real component information and the first imaginary component information.

Step 312D, obtaining a second loss parameter according to the first set of real and imaginary components and the second set of real and imaginary components.

As shown in FIG. 6, the first real component information and the first imaginary component information in the first set of real and imaginary components are compared with the second real component information and the second imaginary component information in the second set of real and imaginary components, and loss sub-parameters are obtained. The second real component information and the second imaginary component information in the second set of real and imaginary components correspond to the first real component information and the first imaginary component information in the first set of real and imaginary components. Multiple loss sub-parameters are added together to obtain the second loss parameter.

Step 312E, using a sum of the first loss parameter and the second loss parameter as the network loss parameter.

The sum of the first loss parameter and the second loss parameter is used as the network loss parameter, to update the complex neural network according to the network loss parameter. Because the synthetic speech, the training speech, and the first real component information and the first imaginary component information outputted by the complex neural network are considered in the process of updating the complex neural network, the speed of network updating can be improved, the training of the complex neural network can be accelerated, and a high-quality complex neural network can be obtained.

Specifically, a gradient descent algorithm is performed on the network loss parameter, so as to realize the update of the complex neural network.

Figure 7:
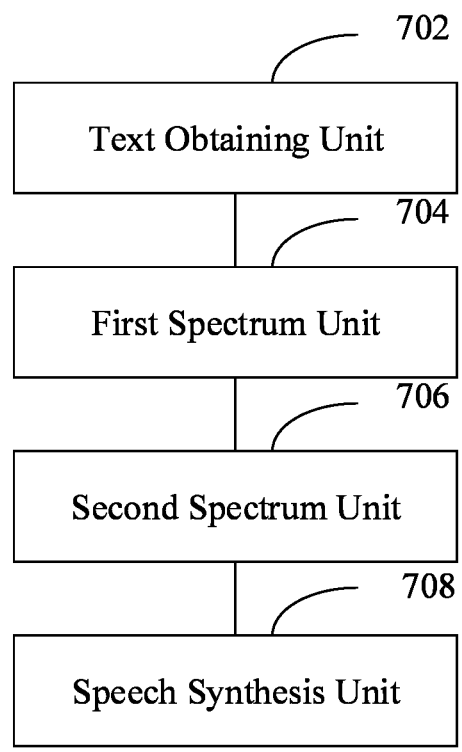
FIG. 7 is a schematic block diagram of one embodiment of a device for speech synthesis in accordance with the present disclosure.

As shown in FIG. 7, in one embodiment, A device 700 for speech synthesis is provided. The device 700 is a computer device or is set up on the computer device. The device 700 includes: a text obtaining unit 702, used for obtaining a speech text to be synthesized; a first spectrum unit 704, used for obtaining a Mel spectrum corresponding to the speech text to be synthesized, according to the speech text to be synthesized; a second spectrum unit 706, used for inputting the Mel spectrum into a complex neural network, and obtaining a complex spectrum corresponding to the speech text to be synthesized, wherein the complex spectrum includes real component information and imaginary component information; and a speech synthesis unit 708, used for obtaining a synthetic speech corresponding to the speech text to be synthesized, according to the complex spectrum.

The above device for speech synthesis, obtains the speech text to be synthesized; obtains the Mel spectrum corresponding to the speech text to be synthesized according to the speech text to be synthesized; inputs the Mel spectrum into the complex neural network, and obtains the complex spectrum corresponding to the speech text to be synthesized and including the real component information and the imaginary component information; and obtains the synthetic speech corresponding to the speech text to be synthesized according to the complex spectrum. Though the above speech synthesis device, the complex spectrum of the speech text is obtained according to the Mel spectrum corresponding to the speech text, the complex spectrum includes the real component information and the imaginary component information, the real component information and the imaginary component information can be regarded as two images, and the pixel points required to generate two images are much smaller than the sample points required to generate speech, therefore, compared with the WaveNet autoregressive method, the above device has lower complexity and higher synthesis efficiency.

In one embodiment, the speech synthesis unit 708 includes: an inverse transformation unit, used for processing the complex spectrum by using an inverse short-time Fourier transform, and obtaining the synthetic speech corresponding to the speech text to be synthesized.

Figure 8:
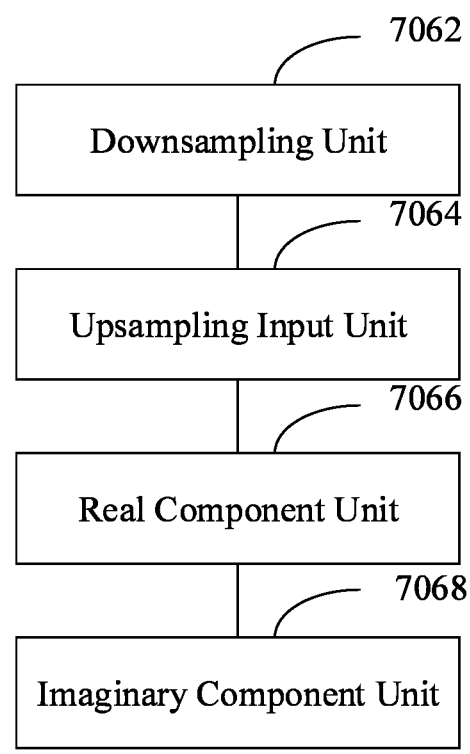
FIG. 8 is a schematic block diagram of one embodiment of a second spectrum unit 706 in accordance with the present disclosure.

In one embodiment, the complex neural network includes a downsampling network and an upsampling network, and the upsampling network includes: a real component deconvolution kernel and an imaginary component deconvolution kernel. As shown in FIG. 8, the second spectrum unit 706 includes: a downsampling unit 7062, used for inputting the Mel spectrum into the downsampling network of the complex neural network, and obtaining spectrum features corresponding to the Mel spectrum outputted by the downsampling network; an upsampling input unit 7064, used for inputting the spectrum features corresponding to the Mel spectrum into the upsampling network; a real component unit 7066, used for processing the spectrum features corresponding to the Mel spectrum by the real component deconvolution kernel of the upsampling network, and obtaining the real component information corresponding to the speech text to be synthesized; and an imaginary component unit 7068, used for processing the spectrum features corresponding to the Mel spectrum by the imaginary component deconvolution kernel of the upsampling network, and obtaining the imaginary component information corresponding to the speech text to be synthesized.

Figure 9:
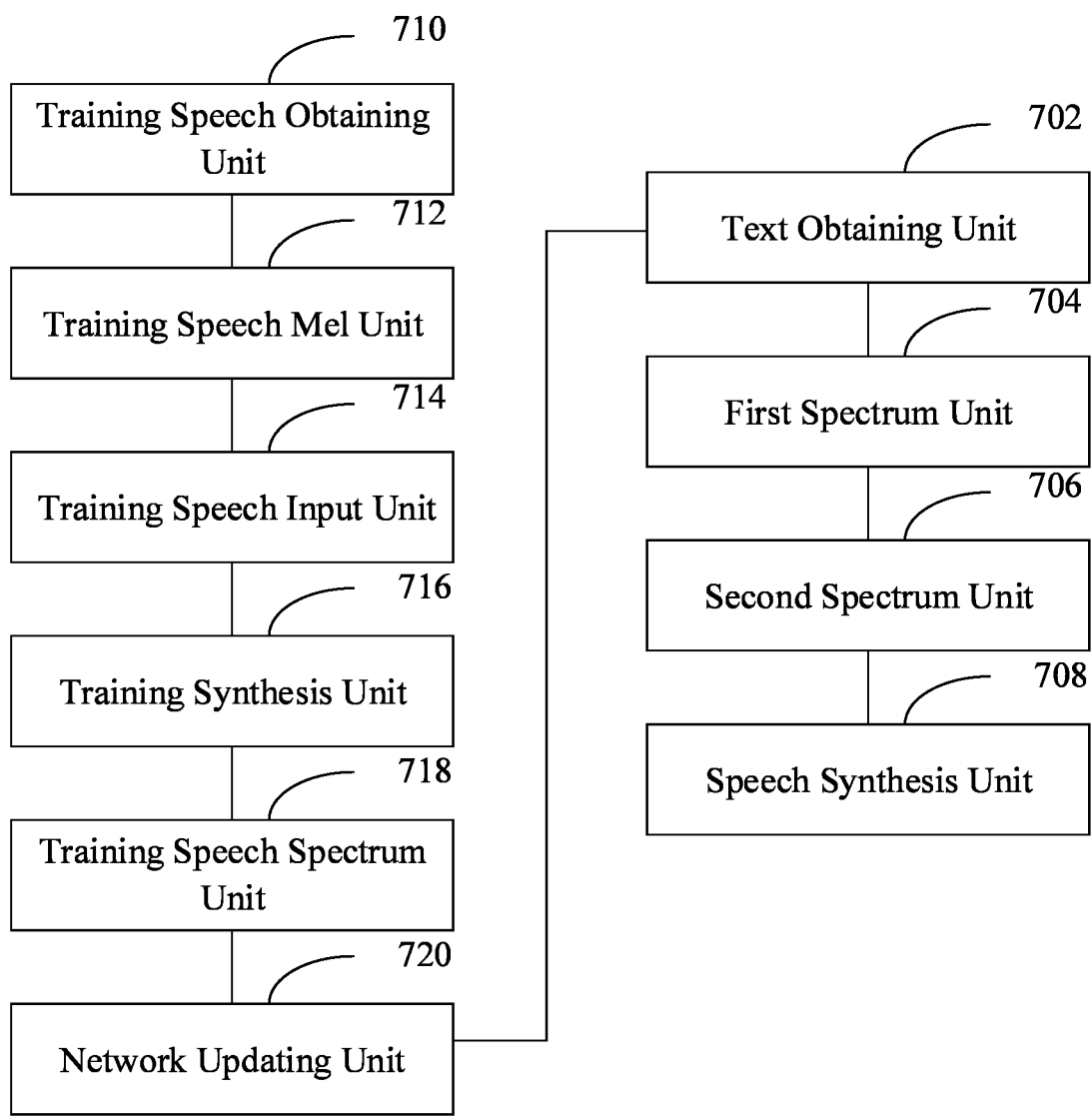
FIG. 9 is a schematic block diagram of another embodiment of the device for speech synthesis in accordance with the present disclosure.

In one embodiment, as shown in FIG. 9, the device 700 further includes: a training speech obtaining unit 710, used for obtaining a training speech; a training speech Mel unit 712, used for obtaining a Mel spectrum corresponding to the training speech according to the training speech; a training speech input unit 714, used for inputting the Mel spectrum corresponding to the training speech into the complex neural network, and obtaining first real component information and first imaginary component information corresponding to the training speech; a training synthesis unit 716, used for obtaining a synthetic speech corresponding to the training speech, according to the first real component information and the first imaginary component information; a training speech spectrum unit 718, used for obtaining second real component information and second imaginary component information corresponding to training speech, according to the training speech; and a network updating unit 720, used for obtaining a network loss parameter according to the training speech, the synthetic speech corresponding to the training speech, the first real component information, the first imaginary component information, the second real component information, and the second imaginary component information, to update the complex neural network according to the network loss parameter.

In one embodiment, the network updating unit 720 includes; a first loss unit, used for obtaining a first loss parameter, according to the training speech and the synthetic speech corresponding to the training speech; a first sampling unit, used for sampling the first real component information and the first imaginary component information, and obtaining a first set of real and imaginary components, wherein the first set of real and imaginary components includes a preset number of the real component information and the imaginary component information with different dimensions; a second sampling unit, used for sampling the second real component information and the second imaginary component information, and obtaining a second set of real component and imaginary components, wherein the second set of real and imaginary components includes a preset number of the real component information and the imaginary component information with different dimensions; a sampling loss unit, used for obtaining a second loss parameter according to the first set of real and imaginary components and the second set of real and imaginary components; and a loss sum unit, used for using a sum of the first loss parameter and the second loss parameter as the network loss parameter.

In one embodiment, the training speech Mel unit, includes: a short-time Fourier unit, used for processing the training speech by using a short-time Fourier transform, and obtaining a complex spectrum corresponding to the training speech; a spectrum calculating unit, used for calculating and obtaining an amplitude spectrum and a phase spectrum corresponding to the training speech, according to the complex spectrum corresponding to the training speech; and a Mel filtering unit, used for filtering the amplitude spectrum corresponding to the training speech by using a Mel filter, and obtaining the Mel spectrum corresponding to the training speech.

Figure 10:
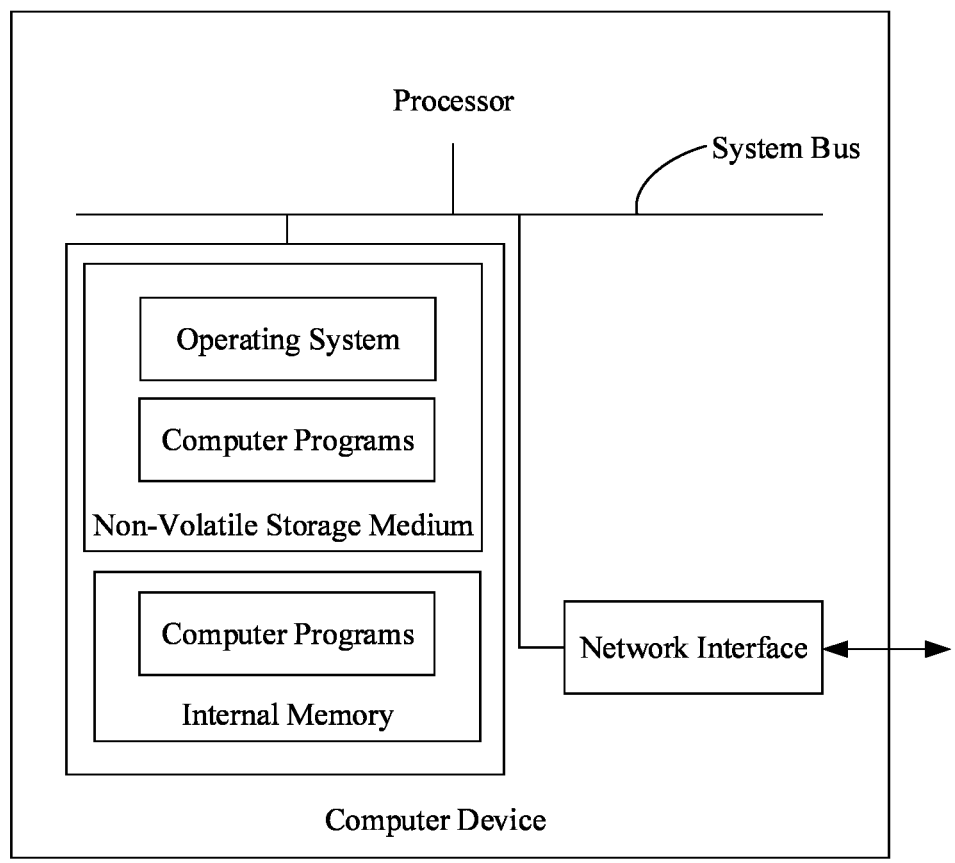
FIG. 10 is a schematic block diagram of one embodiment of a computer device in accordance with the present disclosure.

FIG. 10 is a schematic block diagram of one embodiment of a computer device in accordance with the present disclosure. The computer device maybe a server, or a terminal. As shown in FIG. 10, the computer device includes a processor, a memory, and a network interface, and the processor, the memory, and the network interface are connected via the system bus. The network interface is used to communicate with external apparatuses via a network, for example, the computer device obtains the speech text to be synthesized or the training speech from an external apparatus, or outputs the synthetic speech corresponding to the speech text to be synthesized to the external apparatus, by the network interface. The memory includes a non-volatile storage medium and an internal memory. The non-volatile storage medium of the computer device stores an operating system, and further stores computer programs which when executed by the processor cause the processor to perform a method for speech synthesis. The internal memory also stores the computer programs, which when executed by the processor cause the processor to perform the method for speech synthesis. Those skilled in the art should also know that the structure shown in FIG. 10, is only a block diagram of part of the structure related to the solution of the present disclosure, and it does not constitute a limitation on the computer device used to perform the solution of the present disclosure. Specifically, the computer device may have more or fewer components than shown, may combine two or more components, or a may have a different configuration or arrangement of the components.

In one embodiment, the method for speech synthesis provided by the present disclosure can be realize in the form of computer programs, and the computer programs can be run on the computer device as shown in FIG. 10. The memory of the computer device can store various program templates that make up a device for speech synthesis. For example, the text obtaining unit 702, the first spectrum unit 704, the second spectrum unit 706, and the speech synthesis unit 708.

A computer device, includes: a processor and a non-transitory memory, the non-transitory memory storing computer programs, when the computer programs are executed by the processor, the following steps are performed: obtaining a speech text to be synthesized; obtaining a Mel spectrum corresponding to the speech text to be synthesized, according to the speech text to be synthesized; inputting the Mel spectrum into a complex neural network, and obtaining a complex spectrum corresponding to the speech text to be synthesized, wherein the complex spectrum includes real component information and imaginary component information; and obtaining a synthetic speech corresponding to the speech text to be synthesized, according to the complex spectrum.

In one embodiment, the step of obtaining the synthetic speech corresponding to the speech text to be synthesized, according to the complex spectrum, includes: processing the complex spectrum by using an inverse short-time Fourier transform, and obtaining the synthetic speech corresponding to the speech text to be synthesized.

In one embodiment, the complex neural network includes a downsampling network and an upsampling network, and the upsampling network includes a real component deconvolution kernel and an imaginary component deconvolution kernel. The step of inputting the Mel spectrum into the complex neural network, and obtaining the complex spectrum corresponding to the speech text to be synthesized, includes: inputting the Mel spectrum into the downsampling network of the complex neural network, and obtaining spectrum features corresponding to the Mel spectrum outputted by the downsampling network; inputting the spectrum features corresponding to the Mel spectrum into the upsampling network; processing the spectrum features corresponding to the Mel spectrum by the real component deconvolution kernel of the upsampling network, and obtaining the real component information corresponding to the speech text to be synthesized; and processing the spectrum features corresponding to the Mel spectrum by the imaginary component deconvolution kernel of the upsampling network, and obtaining the imaginary component information corresponding to the speech text to be synthesized.

In one embodiment, when the computer programs are executed by the processor, the following steps are further performed: obtaining a training speech before obtaining the speech text to be synthesized; obtaining a Mel spectrum corresponding to the training speech, according to the training speech; inputting the Mel spectrum corresponding to the training speech into the complex neural network, and obtaining first real component information and first imaginary component information corresponding to the training speech; obtaining a synthetic speech corresponding to the training speech, according to the first real component information and the first imaginary component information;

obtaining second real component information and second imaginary component information corresponding to the training speech, according to the training speech; and obtaining a network loss parameter according to the training speech, the synthetic speech corresponding to the training speech, the first real component information, the first imaginary part information, the second real component information, and the second imaginary component information, to update the complex neural network according to the network loss parameter.

In one embodiment, the step of obtaining the network loss parameter according to the training speech, the synthetic speech corresponding to the training speech, the first real component information, the first imaginary part information, the second real component information, and the second imaginary component information, includes: obtaining a first loss parameter, according to the training speech and the synthetic speech corresponding to the training speech; sampling the first real component information and the first imaginary component information, and obtaining a first set of real and imaginary components, wherein the first set of real and imaginary components includes a preset number of the real component information and the imaginary component information with different dimensions; sampling the second real component information and the second imaginary component information, and obtaining a second set of real component and imaginary components, wherein the second set of real and imaginary components includes a preset number of the real component information and the imaginary component information with different dimensions; obtaining a second loss parameter according to the first set of real and imaginary components and the second set of real and imaginary components; and using a sum of the first loss parameter and the second loss parameter as the network loss parameter.

In one embodiment, the step of obtaining the Mel spectrum corresponding to the training speech, according to the training speech, includes: processing the training speech by using a short-time Fourier transform, and obtaining a complex spectrum corresponding to the training speech; calculating and obtaining an amplitude spectrum and a phase spectrum corresponding to the training speech, according to the complex spectrum corresponding to the training speech; and filtering the amplitude spectrum corresponding to the training speech by using a Mel filter, and obtaining the Mel spectrum corresponding to the training speech.

A non-transitory computer readable storage medium storing computer programs, wherein, when the computer programs are executed by a processor, the following steps are performed: obtaining a speech text to be synthesized; obtaining a Mel spectrum corresponding to the speech text to be synthesized, according to the speech text to be synthesized; inputting the Mel spectrum into a complex neural network, and obtaining the complex spectrum corresponding to the speech text to be synthesized, wherein the complex spectrum includes real component information and imaginary component information; and obtaining a synthetic speech corresponding to the speech text to be synthesized, according to the complex spectrum.

In one embodiment, the step of obtaining the synthetic speech corresponding to the speech text to be synthesized, according to the complex spectrum corresponding to the speech text to be synthesized, includes: processing the complex spectrum by using an inverse short-time Fourier transform, and obtaining the synthetic speech corresponding to the speech text to be synthesized.

In one embodiment, the complex neural network includes a downsampling network and an upsampling network, and the upsampling network includes a real component deconvolution kernel and an imaginary component deconvolution kernel. The step of inputting the Mel spectrum into the complex neural network, and obtaining the complex spectrum corresponding to the speech text to be synthesized, includes: inputting the Mel spectrum into the downsampling network of the complex neural network, and obtaining spectrum features corresponding to the Mel spectrum outputted by the downsampling network; inputting the spectrum features corresponding to the Mel spectrum into the upsampling network; processing the spectrum features corresponding to the Mel spectrum by the real component deconvolution kernel of the upsampling network, and obtaining the real component information corresponding to the speech text to be synthesized; and processing the spectrum features corresponding to the Mel spectrum by the imaginary component deconvolution kernel of the upsampling network, and obtaining the imaginary component information corresponding to the speech text to be synthesized.

In one embodiment, when the computer programs are executed by the processor, the following steps are further performed: obtaining a training speech before obtaining the speech text to be synthesized; obtaining a Mel spectrum corresponding to the training speech, according to the training speech; inputting the Mel spectrum corresponding to the training speech into the complex neural network, and obtaining first real component information and first imaginary component information corresponding to the training speech; obtaining a synthetic speech corresponding to the training speech, according to the first real component information and the first imaginary component information; obtaining second real component information and second imaginary component information corresponding to the training speech, according to the training speech; and obtaining a network loss parameter according to the training speech, the synthetic speech corresponding to the training speech, the first real component information, the first imaginary part information, the second real component information, and the second imaginary component information, to update the complex neural network according to the network loss parameter.

In one embodiment, the step of obtaining the network loss parameter according to the training speech, the synthetic speech corresponding to the training speech, the first real component information, the first imaginary part information, the second real component information, and the second imaginary component information, includes: obtaining a first loss parameter, according to the training speech and the synthetic speech corresponding to the training speech; sampling the first real component information and the first imaginary component information, and obtaining a first set of real and imaginary components, wherein the first set of real and imaginary components includes a preset number of the real component information and the imaginary component information with different dimensions; sampling the second real component information and the second imaginary component information, and obtaining a second set of real component and imaginary components, wherein the second set of real and imaginary components includes a preset number of the real component information and the imaginary component information with different dimensions; obtaining a second loss parameter according to the first set of real and imaginary components and the second set of real and imaginary components; and using a sum of the first loss parameter and the second loss parameter as the network loss parameter.

In one embodiment, the step of obtaining the Mel spectrum corresponding to the training speech, according to the training speech, includes: processing the training speech by using a short-time Fourier transform, and obtaining a complex spectrum corresponding to the training speech; calculating and obtaining an amplitude spectrum and a phase spectrum corresponding to the training speech, according to the complex spectrum corresponding to the training speech; and filtering the amplitude spectrum corresponding to the training speech by using a Mel filter, and obtaining the Mel spectrum corresponding to the training speech.

It should be noted that, the above method for speech synthesis, device for speech synthesis, computer device, and non-transitory computer readable storage medium belong to a general inventive concept, the contents in the embodiments of the method for speech synthesis, device for speech synthesis, computer device, and non-transitory computer readable storage medium are mutually applicable.

It can be understood by those skilled in the art that the whole or parts of the process of the method in the above embodiment can be realized by computer programs instructing related hardware, the computer programs are stored in a non-transitory computer readable storage medium, when the programs are executed, it can include such as process of the embodiment of the above each method. Any reference to memory, storage, database or other media used in the embodiments provided in the present disclosure may include volatile and/or non-volatile memory. The non-volatile memory can include read only memory (ROM), programmable ROM (PROM), electrically programmable ROM (EPROM), electrically erasable ROM (EEPROM), or flash memory. The volatile memory can include random-access memory (RAM), or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchnonous Link DRAM (SLDRAM), Rambus direct RAM (RDRAM), direct Rambus dynamic RAM (DRDRAM), and Rambus dynamic RAM (RDRAM).

The technical features of the above embodiments can be employed in arbitrary combinations, for convenience of description, not all possible combinations of the various technical features in the above embodiments are described, however, as long as there is no contradiction in the combination of these technical features, it should be considered as the scope of the present specification.

The above embodiments only describe some embodiments of the present disclosure, the description of the above embodiments is more specific and detailed, but it cannot be understood as a limitation on the scope of the present disclosure. It should be noted, for those skilled in the art, some improvements and refinements can also be made without departing from the principle of the present disclosure, and these improvements and refinements should fall within the scope of the present disclosure. Therefore, the protection scope of the present disclosure shall be subject to the protection scope defined by the claims.

What is claimed is:

1. A computer-implemented method for speech synthesis, comprising:
    obtaining a speech text to be synthesized;
    obtaining a Mel spectrum corresponding to the speech text to be synthesized, according to the speech text to be synthesized;
    inputting the Mel spectrum into a complex neural network, and obtaining a complex spectrum corresponding to the speech text to be synthesized, wherein the complex spectrum comprises real component information and imaginary component information; and
    obtaining a synthetic speech corresponding to the speech text to be synthesized, according to the complex spectrum;
    wherein the complex neural network comprises a downsampling network and an upsampling network, the upsampling network comprises a real component deconvolution kernel and an imaginary component deconvolution kernel, and the step of inputting the Mel spectrum into the complex neural network, and obtaining the complex spectrum corresponding to the speech text to be synthesized, comprises:
    inputting the Mel spectrum into the downsampling network of the complex neural network, and obtaining spectrum features corresponding to the Mel spectrum outputted by the downsampling network;
    inputting the spectrum features corresponding to the Mel spectrum into the upsampling network;
    processing the spectrum features corresponding to the Mel spectrum by the real component deconvolution kernel of the upsampling network, and obtaining the real component information corresponding to the speech text to be synthesized; and
    processing the spectrum features corresponding to the Mel spectrum by the imaginary component deconvolution kernel of the upsampling network, and obtaining the imaginary component information corresponding to the speech text to be synthesized.

2. The method as claimed in claim 1, wherein the step of obtaining the synthetic speech corresponding to the speech text to be synthesized, according to the complex spectrum, comprises:
    processing the complex spectrum by using an inverse short-time Fourier transform, and obtaining the synthetic speech corresponding to the speech text to be synthesized.

3. The method as claimed in claim 1, wherein before the step of obtaining the speech text to be synthesized, the method further comprises:
    obtaining a training speech;
    obtaining a Mel spectrum corresponding to the training speech, according to the training speech;
    inputting the Mel spectrum corresponding to the training speech into the complex neural network, and obtaining first real component information and first imaginary component information corresponding to the training speech;
    obtaining a synthetic speech corresponding to the training speech, according to the first real component information and the first imaginary component information;
    obtaining second real component information and second imaginary component information corresponding to the training speech, according to the training speech; and
    obtaining a network loss parameter according to the training speech, the synthetic speech corresponding to the training speech, the first real component information, the first imaginary part information, the second real component information, and the second imaginary component information, to update the complex neural network according to the network loss parameter.

4. The method as claimed in claim 3, wherein the step of obtaining the network loss parameter according to the training speech, the synthetic speech corresponding to the training speech, the first real component information, the first imaginary part information, the second real component information, and the second imaginary component information, comprises:

obtaining a first loss parameter, according to the training speech and the synthetic speech corresponding to the training speech;

sampling the first real component information and the first imaginary component information, and obtaining a first set of real and imaginary components, wherein the first set of real and imaginary components comprises a preset number of the real component information and the imaginary component information with different dimensions;

sampling the second real component information and the second imaginary component information, and obtaining a second set of real and imaginary components, wherein the second set of real and imaginary components comprises a preset number of the real component information and the imaginary component information with different dimensions;

obtaining a second loss parameter, according to the first set of real and imaginary components and the second set of real and imaginary components; and using a sum of the first loss parameter and the second loss parameter as the network loss parameter.

5. The method as claimed in claim 3, wherein the step of obtaining the Mel spectrum corresponding to the training speech, according to the training speech, comprises:

processing the training speech by using a short-time Fourier transform, and obtaining a complex spectrum corresponding to the training speech;

calculating and obtaining an amplitude spectrum and a phase spectrum corresponding to the training speech, according to the complex spectrum corresponding to the training speech; and filtering the amplitude spectrum corresponding to the training speech by using a mel filter, and obtaining the Mel spectrum corresponding to the training speech.

6. The method as claimed in claim 4, wherein the step of obtaining the second loss parameter, according to the first set of real and imaginary components and the second set of real and imaginary components, comprises:

comparing the real component information and the imaginary component information in the first set of real and imaginary components with corresponding real component information and corresponding imaginary component information in the second set of real and imaginary components, and obtaining multiple loss sub-parameters; and adding the multiple loss sub-parameters together, and obtaining the second loss parameter.

7. The method as claimed in claim 3, wherein the step of obtaining the synthetic speech corresponding to the training speech, according to the first real component information and the first imaginary component information, comprises:

processing the first real component information and the first imaginary component information by using an inverse short-time Fourier transform, and obtaining the synthetic speech corresponding to the training speech.

8. The method as claimed in claim 3, wherein the step of obtaining the second real component information and the second imaginary component information corresponding to the training speech, according to the training speech, comprises:

processing the training speech by using a short-time Fourier transform, and obtaining the second real component information and the second imaginary component information corresponding to the training speech.

9. The method as claimed in claim 3, wherein after the step of obtaining the network loss parameter according to the training speech, the synthetic speech corresponding to the training speech, the first real component information, the first imaginary part information, the second real component information, and the second imaginary component information, the method further comprises:

updating the complex neural network by performing a gradient descent algorithm on the network loss parameter.

10. A computer device, wherein, the computer device comprises a processor and a non-transitory memory, the non-transitory memory storing computer programs, which when executed by the processor cause the processor to perform following steps:

obtaining a speech text to be synthesized;

obtaining a Mel spectrum corresponding to the speech text to be synthesized, according to the speech text to be synthesized;

inputting the Mel spectrum into a complex neural network, and obtaining a complex spectrum corresponding to the speech text to be synthesized, wherein the complex spectrum comprises real component information and imaginary component information; and obtaining a synthetic speech corresponding to the speech text to be synthesized, according to the complex spectrum;

wherein when the computer programs are executed by the processor cause the processor to further perform following steps:

obtaining a training speech before obtaining the speech text to be synthesized;

obtaining a Mel spectrum corresponding to the training speech, according to the training speech;

inputting the Mel spectrum corresponding to the training speech into the complex neural network, and obtaining first real component information and first imaginary component information corresponding to the training speech;

obtaining a synthetic speech corresponding to the training speech, according to the first real component information and the first imaginary component information;

obtaining second real component information and second imaginary component information corresponding to the training speech, according to the training speech; and obtaining a network loss parameter according to the training speech, the synthetic speech corresponding to the training speech, the first real component information, the first imaginary part information, the second real component information, and the second imaginary component information, to update the complex neural network according to the network loss parameter.

11. The computer device as claimed in claim 10, wherein the step of obtaining the synthetic speech corresponding to the speech text to be synthesized, according to the complex spectrum, comprises:

processing the complex spectrum by using an inverse short-time Fourier transform, and obtaining the synthetic speech corresponding to the speech text to be synthesized.

12. The computer device as claimed in claim 10, wherein the complex neural network comprises a downsampling network and an upsampling network, the upsampling network comprises a real component deconvolution kernel and an imaginary component deconvolution kernel, and the step of inputting the Mel spectrum into the complex neural network, and obtaining the complex spectrum corresponding to the speech text to be synthesized, comprises:
    inputting the Mel spectrum into the downsampling network of the complex neural network, and obtaining spectrum features corresponding to the Mel spectrum outputted by the downsampling network;
    inputting the spectrum features corresponding to the Mel spectrum into the upsampling network;
    processing the spectrum features corresponding to the Mel spectrum by the real component deconvolution kernel of the upsampling network, and obtaining the real component information corresponding to the speech text to be synthesized; and
    processing the spectrum features corresponding to the Mel spectrum by the imaginary component deconvolution kernel of the upsampling network, and obtaining the imaginary component information corresponding to the speech text to be synthesized.

13. The computer device as claimed in claim 10, wherein the step of obtaining the network loss parameter according to the training speech, the synthetic speech corresponding to the training speech, the first real component information, the first imaginary part information, the second real component information, and the second imaginary component information, comprises:
    obtaining a first loss parameter, according to the training speech and the synthetic speech corresponding to the training speech;
    sampling the first real component information and the first imaginary component information, and obtaining a first set of real and imaginary components, wherein the first set of real and imaginary components comprises a preset number of the real component information and the imaginary component information with different dimensions;
    sampling the second real component information and the second imaginary component information, and obtaining a second set of real and imaginary components, wherein the second set of real and imaginary components comprises a preset number of the real component information and the imaginary component information with different dimensions;
    obtaining a second loss parameter, according to the first set of real and imaginary components and the second set of real and imaginary components; and
    using a sum of the first loss parameter and the second loss parameter as the network loss parameter.

14. The computer device as claimed in claim 10, wherein the step of obtaining the Mel spectrum corresponding to the training speech, according to the training speech, comprises:
    processing the training speech by using a short-time Fourier transform, and obtaining a complex spectrum corresponding to the training speech;
    calculating and obtaining an amplitude spectrum and a phase spectrum corresponding to the training speech, according to the complex spectrum corresponding to the training speech; and
    filtering the amplitude spectrum corresponding to the training speech by using a mel filter, and obtaining the Mel spectrum corresponding to the training speech.

15. The computer device as claimed in claim 13, wherein the step of obtaining the second loss parameter, according to the first set of real and imaginary components and the second set of real and imaginary components, comprises:
    comparing the real component information and the imaginary component information in the first set of real and imaginary components with corresponding real component information and corresponding imaginary component information in the second set of real and imaginary components, and obtaining multiple loss sub-parameters; and
    adding the multiple loss sub-parameters together, and obtaining the second loss parameter.

16. The computer device as claimed in claim 10, wherein the step of obtaining the synthetic speech corresponding to the training speech, according to the first real component information and the first imaginary component information, comprises:
    processing the first real component information and the first imaginary component information by using an inverse short-time Fourier transform, and obtaining the synthetic speech corresponding to the training speech; and
    wherein the step of obtaining the second real component information and the second imaginary component information corresponding to the training speech, according to the training speech, comprises:
    processing the training speech by using a short-time Fourier transform, and obtaining the second real component information and the second imaginary component information corresponding to the training speech.

17. The computer device as claimed in claim 10, wherein when the computer programs are executed by the processor cause the processor to further perform following steps:
    updating the complex neural network by performing a gradient descent algorithm on the network loss parameter, after obtaining the network loss parameter according to the training speech, the synthetic speech corresponding to the training speech, the first real component information, the first imaginary part information, the second real component information, and the second imaginary component information.

18. A non-transitory computer readable storage medium storing computer programs, wherein, when the computer programs are executed by a processor, following steps are performed:
    obtaining a speech text to be synthesized;
    obtaining a Mel spectrum corresponding to the speech text to be synthesized, according to the speech text to be synthesized;
    inputting the Mel spectrum into a complex neural network, and obtaining a complex spectrum corresponding to the speech text to be synthesized, wherein the complex spectrum comprises real component information and imaginary component information; and
    obtaining a synthetic speech corresponding to the speech text to be synthesized, according to the complex spectrum;
    wherein the complex neural network comprises a downsampling network and an upsampling network, the upsampling network comprises a real component deconvolution kernel and an imaginary component deconvolution kernel, and the step of inputting the Mel spectrum into the complex neural network, and obtaining the complex spectrum corresponding to the speech text to be synthesized, comprises:
    inputting the Mel spectrum into the downsampling network of the complex neural network, and obtaining spectrum features corresponding to the Mel spectrum outputted by the downsampling network;

inputting the spectrum features corresponding to the Mel spectrum into the upsampling network;

processing the spectrum features corresponding to the Mel spectrum by the real component deconvolution kernel of the upsampling network, and obtaining the real component information corresponding to the speech text to be synthesized; and processing the spectrum features corresponding to the Mel spectrum by the imaginary component deconvolution kernel of the upsampling network, and obtaining the imaginary component information corresponding to the speech text to be synthesized.

19. The non-transitory computer readable storage medium as claimed in claim 18, wherein the step of obtaining the synthetic speech corresponding to the speech text to be synthesized, according to the complex spectrum, comprises:

processing the complex spectrum by using an inverse short-time Fourier transform, and obtaining the synthetic speech corresponding to the speech text to be synthesized.

20. The non-transitory computer readable storage medium as claimed in claim 18, when the computer programs are executed by the processor, following steps are further performed:

obtaining a training speech;

obtaining a Mel spectrum corresponding to the training speech, according to the training speech;

inputting the Mel spectrum corresponding to the training speech into the complex neural network, and obtaining first real component information and first imaginary component information corresponding to the training speech;

obtaining a synthetic speech corresponding to the training speech, according to the first real component information and the first imaginary component information;

obtaining second real component information and second imaginary component information corresponding to the training speech, according to the training speech; and obtaining a network loss parameter according to the training speech, the synthetic speech corresponding to the training speech, the first real component information, the first imaginary part information, the second real component information, and the second imaginary component information, to update the complex neural network according to the network loss parameter.

* * * * *